(12) United States Patent     (10) Patent No.: US 8,714,748 B2
Lin     (45) Date of Patent: May 6, 2014

(54) LIGHT SOURCE SYSTEM FOR PROJECTION DEVICE AND PROJECTION DEVICE COMPRISING THE SAME

(75) Inventor: Hung-Ying Lin, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 126 days.

(21) Appl. No.: 13/315,828

(22) Filed: Dec. 9, 2011

(65) Prior Publication Data

US 2012/0188514 A1     Jul. 26, 2012

(30) Foreign Application Priority Data

Jan. 21, 2011 (TW) ............................... 100102222 A

(51) Int. Cl.
*G03B 21/14* (2006.01)
(52) U.S. Cl.
USPC .................. 353/38; 353/30; 353/31; 353/34; 353/94; 353/99; 359/619; 359/856; 362/296.01; 362/296.06
(58) Field of Classification Search
USPC ........... 353/30, 31, 33, 34, 37, 38, 81, 94, 98, 353/99; 362/231, 247, 296.01, 296.06, 362/296.09, 511; 359/34, 619, 856
See application file for complete search history.

(56) References Cited

U.S. PATENT DOCUMENTS

| | | | |
|---|---|---|---|
| 4,357,075 A | 11/1982 | Hunter | |
| 5,315,330 A * | 5/1994 | Hamada | ........................... 353/31 |
| 7,059,731 B2 | 6/2006 | Lee et al. | |
| 7,267,441 B2 | 9/2007 | Lee et al. | |
| 7,484,820 B2 | 2/2009 | Sakata et al. | |
| 7,484,850 B2 | 2/2009 | Sakata et al. | |
| 7,530,712 B2 | 5/2009 | Lin et al. | |
| 7,621,641 B1 * | 11/2009 | Silverstein et al. | ............. 353/20 |
| 8,317,331 B2 * | 11/2012 | Li | ................................... 353/31 |
| 2005/0185143 A1 * | 8/2005 | Bossche et al. | .................. 353/31 |
| 2005/0248958 A1 * | 11/2005 | Li | .................................. 362/555 |
| 2006/0238720 A1 | 10/2006 | Lee et al. | |
| 2007/0279595 A1 * | 12/2007 | Magarill | ......................... 353/33 |
| 2009/0213338 A1 * | 8/2009 | Inoko | .............................. 353/38 |
| 2009/0310042 A1 * | 12/2009 | Vidal et al. | ........................ 349/8 |

FOREIGN PATENT DOCUMENTS

| | | |
|---|---|---|
| CN | 1700055 A | 11/2005 |
| JP | 2005157059 A | 6/2005 |
| JP | 2005283817 A | 10/2005 |
| JP | 2005338827 A | 12/2005 |
| JP | 2006309231 A | 11/2006 |
| JP | 2006527416 A | 11/2006 |

(Continued)

OTHER PUBLICATIONS

First Office Action for Japanese No. 2011-179151; Date of Mailing; Apr. 23, 2013, with English Translation.

(Continued)

*Primary Examiner* — Sultan Chowdhury
(74) *Attorney, Agent, or Firm* — Cantor Colburn LLP

(57) ABSTRACT

A light source system for a projection device and a projection device comprising the same are provided. The light source system comprises an optical component assembly and a first light source module. The first light source module has a first light emitting diode (LED) and a first reflection cover. The first LED is configured to generate beams. The first reflection cover has a curved surface to reflect and collect the beams from the first LED into the optical component assembly.

19 Claims, 2 Drawing Sheets

(56) References Cited

FOREIGN PATENT DOCUMENTS

| JP | 2007101732 A | 4/2007 |
|---|---|---|
| JP | 2008041256 A | 2/2008 |
| JP | 2008-111889 A | 5/2008 |
| JP | 2008-241768 A | 10/2008 |
| JP | 2010-113266 A | 5/2010 |
| JP | 2010-175714 A | 8/2010 |
| TW | I294023 | 3/2008 |
| TW | I307174 | 3/2009 |
| TW | M362363 U1 | 8/2009 |

OTHER PUBLICATIONS

First Office Action for Taiwan Application No. 100102222; Date of Mailing: Jul. 22, 2013, with English Translation.
Office Action for Japanese Patent Application No. 2011-179151, mailed Dec. 5, 2013, with English translation.

* cited by examiner

LIGHT SOURCE SYSTEM FOR PROJECTION DEVICE AND PROJECTION DEVICE COMPRISING THE SAME

This application claims the benefit from the priority to Taiwan Patent Application No. 100102222 filed on Jan. 21, 2011, the disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to a light source system and a projection device using the light source system.

2. Descriptions of the Related Art

Because light emitting diodes (LEDs) have many advantages such as a long service life, a small volume and a low operating temperature, they have gradually replaced ultra high pressure (UHP) mercury bulbs as light sources of projection devices.

FIG. 1 illustrates a schematic view of a light source system 1 of a conventional projection device. The conventional light source system 1 comprises an LED 11 and a lens set 12. The LED 11 is disposed on the side of the lens set 12 so that a plurality of beams 111 of the LED 11 can be converged via the lens set 12. However, because the beams 111 of the LED 11 are highly divergent, it is impossible to project all of the beams into the lens set, and this unfavorably affects the luminance of frames projected by the conventional projection device. Moreover, the lens set 12 comprises a plurality of aspherical lenses with different curvatures. The disposition of the aspherical lenses not only adds to the volume of the conventional projection device but also significantly increases the production cost of the conventional projection device due to the complex manufacturing process of the aspherical lenses.

In view of this, an urgent need exists in the art to provide a light source system and a projection device comprising the light source system which can make full use of beams of the LEDs effectively and reduce the volume of the projection device.

SUMMARY OF THE INVENTION

To solve the aforesaid problem, an objective of the present invention is to provide a projection device and a light source system thereof. The light source system can effectively converge beams of light emitting diodes (LEDs) to eliminate unnecessary light loss and improve the utilization efficiency of a light source; meanwhile, the light source system is made to have a simplified structure to reduce the volume of the projection device.

To achieve the aforesaid objective, the projection device of the present invention comprises an imaging system and a light source system. The light source system provides a light source to the imaging system. The light source system comprises an optical component assembly and a first light source module, while the first light source module has a first LED and a first reflection cover. The first LED emits a plurality of beams. The first reflection cover has a curved surface for reflecting and effectively collecting the beams of the first LED into the optical component assembly; and through the optical component assembly, the beams are projected to the imaging system so that the projection device generates a projection frame with a sufficient luminance.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
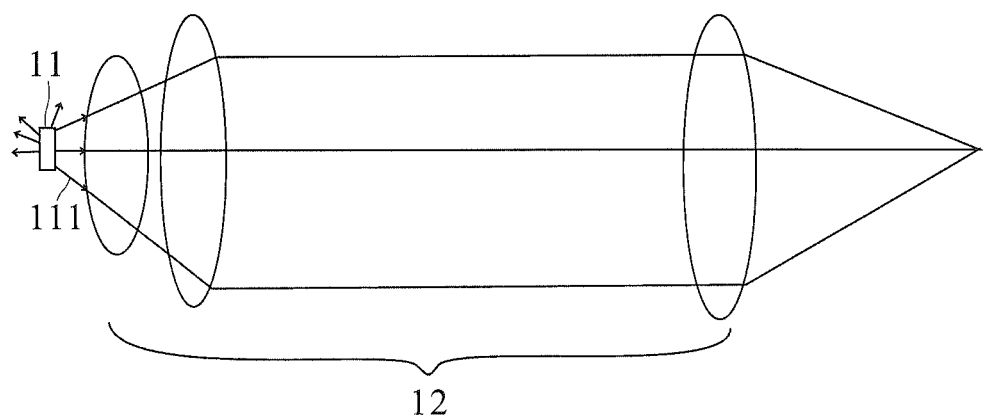
FIG. 1 is a schematic view of a conventional light source module.
Figure 2:
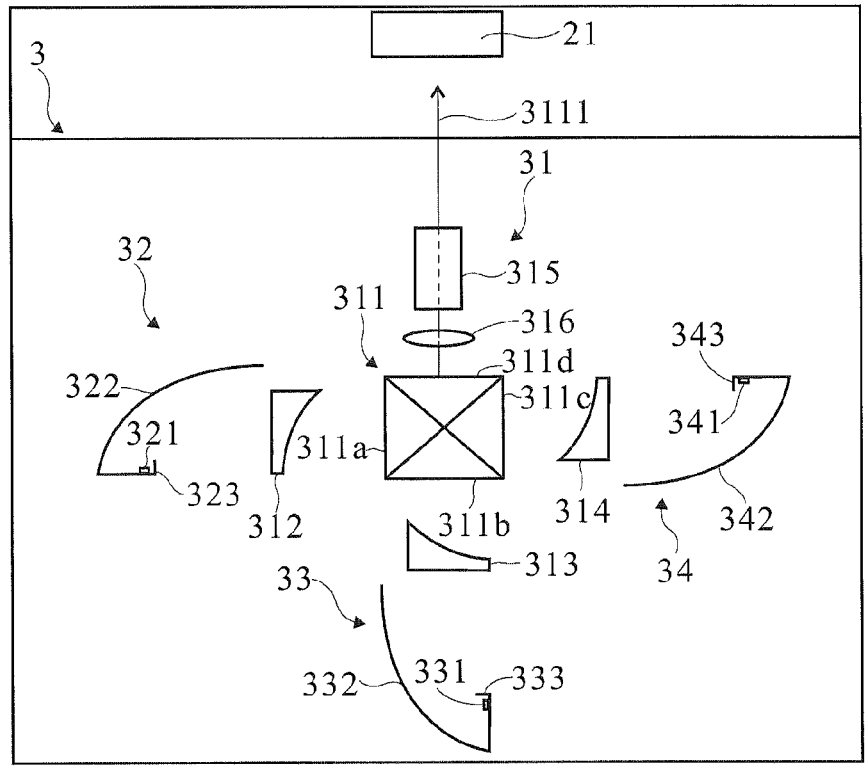
FIG. 2 is a schematic view of a projection device according to an embodiment of the present invention.

FIG. 2 illustrates a schematic view of a projection device 2 of the present invention. In an embodiment of the present invention, the projection device 2 comprises an imaging system 21 and a light source system 3. The light source system 3 is adapted to provide a light source to the imaging system 21. In the attached drawings, elements unrelated to the present invention are omitted from depiction; and shapes of and dimensional relationships among individual elements in the attached drawings are illustrated only for ease of understanding but are not limited to the actual structure and scale.

Figure 3:
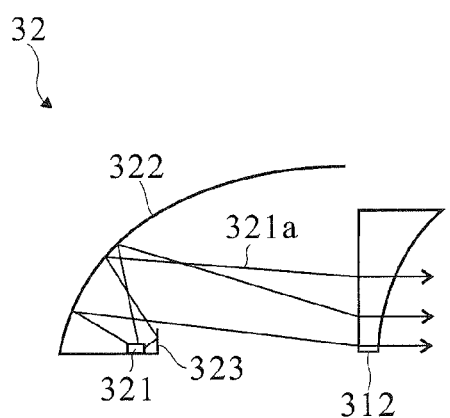
FIG. 3 is a schematic view illustrating a path of beams of a first light source module according to an embodiment of the present invention.

In detail, with reference to FIGS. 2 and 3, the light source system 3 comprises an optical component assembly 31 and a first light source module 32. The first light source module 32 comprises a first light emitting diode (LED) 321 and a first reflection cover 322. The first LED 321 is adapted to emit a plurality of beams 321a. The first reflection cover 322 has a curved surface and is disposed on the side of the first LED 321 and extends above the first LED 321 to effectively reflect and collect the beams 321a of the first LED 321 into the optical component assembly 31.

As shown in FIG. 2, in this embodiment, the light source system 3 further comprises a second light source module 33 and a third light source module 34. The second light source module 33 comprises a second LED 331 emitting a plurality of beams and a second reflection cover 332 with a curved surface. The third light source module 34 comprises a third LED 341 also emitting a plurality of beams and a third reflection cover 342 also having a curved surface. The second reflection cover 332 and the third reflection cover 342 are disposed on one side of the second LED 331 and on one side of the third LED 341 and extend above the second LED 331 and the third LED 341 to reflect and collect most of the beams of the second LED 331 and the third LED 341 into the optical component assembly 31 respectively.

Expanding on the above, to reflect and collect part of the beams emitted from the other side of each of the first LED 321, the second LED 331 and the third LED 341, a first reflection mirror 323, a second reflection mirror 333 and a third reflection mirror 343 are disposed on the other side of each of the first LED 321, the second LED 331 and the third LED 341 respectively. That is, the first LED 321 is disposed between the first reflection cover 322 and the first reflection mirror 323; the second LED 331 is disposed between the second reflection cover 332 and the second reflection mirror 333; the third LED 341 is disposed between the third reflection cover 342 and the third reflection mirror 343; and the first reflection mirror 323, the second reflection mirror 333 and the third reflection mirror 343 are adapted to reflect the beams from the other side of the first LED 321 to the first reflection cover 322, reflect the beams from the other side of the second LED 331 to the second reflection cover 332 and reflect the beams from the other side of the third LED 341 to the third reflection cover 342 respectively.

Preferably, in this embodiment, the curved surface of each of the first reflection cover 322, the second reflection cover 332 and the third reflection cover 342 is an ellipsoid with two ellipse focuses. The first LED 321, the second LED 331 and the third LED 341 are disposed at one of the two ellipse focuses of the first reflection cover 322, the second reflection cover 332 and the third reflection cover 342 respectively to reflect and collect the respective beams of the first LED 321, the second LED 331 and the third LED 341 into the optical component assembly 31. It shall be appreciated that in other embodiments of the present invention, the curvatures of the first reflection cover 322, the second reflection cover 332 and the third reflection cover 342 may be adjusted according to the actual requirements respectively; and this will be readily inferred by those of ordinary skill in the art based on the description of the present invention, and thus will not be further described herein.

As shown in FIG. 2, the optical component assembly 31 of this embodiment further comprises a light consolidating device 311, a first lens 312, a second lens 313, a third lens 314, a light homogenizing component 315 and a fourth lens 316. The first light source module 32 is disposed corresponding to a first side 311a of the light consolidating device 311, and the first lens 312 is disposed between the first light source module 32 and the first side 311a of the light consolidating device 311. The second light source module 33 is disposed corresponding to a second side 311b of the light consolidating device 311, and the second lens 313 is disposed between the second light source module 33 and the second side 311b of the light consolidating device 311. The third light source module 34 is disposed corresponding to a third side 31k of the light consolidating device 311, while the third lens 314 is disposed between the third light source module 34 and the third side 311c of the light consolidating device 311. The light homogenizing component 315 is disposed corresponding to a fourth side 311d of the light consolidating device 311, while the fourth lens 316 is a convex lens and is disposed between the light consolidating device 311 and the light homogenizing component 315.

FIG. 3 illustrates a schematic view of a path of the beams of the first light source module 32. First, the first reflection cover 322 and the first reflection mirror 323 reflect the beams 321a of the first LED 321. The first lens 312 is a concave lens adapted to parallelize the beams 321a for projection to the light consolidating device 311. The paths of the beams of the second light source module 33 and the third light source module 34 can be inferred from the description of the first light source module 32. In other words, both the second lens 313 and the third lens 314 are a concave lens adapted to parallelize the beams of the second light source module 33 and the third light source module 34 for projection to the light consolidating device 311 respectively.

The light consolidating device 311 consolidates the parallelized beams into a consolidated beam 3111, which then passes through the fourth lens 316 and the light homogenizing component 315. After being converged by the fourth lens 316, the consolidated beam is received and homogenized by the light homogenizing component 315 for projection to the imaging system 21. In this embodiment, the light consolidating device 311 may be an X-Cube. However, in other embodiments of the present invention, the light consolidating device 311 may be one of an X-Plate, an X-Prism and a dichroic filter that has the function of consolidating beams. The light homogenizing component 315 may be either a light tunnel or an integration rod. The varieties, positions and numbers of the optical components in the aforesaid embodiment are only intended to explain the present invention, and other implementations can be readily inferred by those of ordinary skill in the art.

Furthermore, in this embodiment, the first LED 321 is a red LED, the second LED 331 is a green LED, and the third LED 341 is a blue LED. However, the aforesaid implementations of the LEDs are only for the purpose of illustration but not to limit the present invention. For example, the first LED 321 may also be a green LED, the second LED 331 may also be a red LED, and the third LED 341 is still a blue LED. Alternatively, the first LED 321 can be a red LED, the second LED 331 can be a blue LED, and the third LED 341 can be a green LED, and this will not be further described herein.

According to the above descriptions, as compared to the conventional light source module, the light source module of the present invention provided with a reflection cover and a reflection mirror can effectively reflect and collect a plurality of beams of an LED to eliminate unnecessary light loss, so the projection device can project a projection frame with a sufficient luminance to deliver an improved imaging quality. Meanwhile, the structure of the light source system can be simplified to reduce the volume of the projection device, and this can not only reduce the production cost but also satisfy users' demands for a light weight device.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light source system for use in a projection device, comprising:
   an optical component assembly comprising:
      a light consolidating device;
      a light homogenizing component disposed corresponding to a fourth side of the light consolidating device to receive and homogenize the consolidated beam emitted from the light consolidating device;
   a first lens being a concave lens; and
   a first light source module disposed corresponding to a first side of the light consolidating device having:
      a first light emitting diode (LED) emitting a plurality of beams; and
      a first reflection cover having a curved surface to reflect and collect the beams of the first LED into the optical component assembly;
   wherein the first lens is disposed between the first light source module and the first side of the light consolidating device; and the optical component assembly has a fourth lens being a convex lens disposed between the light consolidating device and the light homogenizing component for focusing the consolidated beam emitted from the light consolidating device into the light homogenizing component.

2. The light source system as claimed in claim 1, wherein the first light source module further comprises a first reflection mirror, the first LED is disposed between the first reflection cover and the first reflection mirror, and the first reflection mirror is adapted to reflect part of the beams of the first LED to the first reflection cover.

3. The light source system as claimed in claim 2, wherein the curved surface of the first reflection cover is an ellipsoid having two ellipse focuses, and the first LED is disposed at one of the two ellipse focuses of the first reflection cover.

4. The light source system as claimed in claim 3, further comprising a second light source module having:
   a second LED emitting a plurality of beams;
   a second reflection cover having a curved surface to reflect the beams of the second LED into the optical component assembly, wherein the curved surface of the second reflection cover is an ellipsoid having two ellipse focuses, and the second LED is disposed at one of the ellipse focuses of the second reflection cover; and
   a second reflection mirror, wherein the second LED is disposed between the second reflection cover and the second reflection mirror, and the second reflection mirror is adapted to reflect part of the beams of the second LED to the second reflection cover.

5. The light source system as claimed in claim 4, further comprising a third light source module having:
   a third LED emitting a plurality of beams;
   a third reflection cover having a curved surface to reflect the beams from the third LED into the optical component assembly, wherein the curved surface of the third reflection cover is an ellipsoid having two ellipse focuses, and the third LED is disposed at one of the ellipse focuses of the third reflection cover; and
   a third reflection mirror, wherein the third LED is disposed between the third reflection cover and the third reflection mirror, and the third reflection mirror is adapted to reflect part of the beams of the third LED to the third reflection cover.

6. The light source system as claimed in claim 5, wherein the optical component assembly further comprises the second light source module and the third light source module are disposed corresponding to a second side and a third side of the light consolidating device respectively, and the light consolidating device consolidates the beams of the first light source module, the beams of the second light source module and the beams of the third light source module to form a consolidated beam.

7. The light source system as claimed in claim 6, wherein the light consolidating device is one of an X-Prism, an X-Cube, an X-Plate and a dichroic filter.

8. The light source system as claimed in claim 6, wherein the first LED, the second LED and the third LED are a red LED, a green LED and a blue LED respectively.

9. The light source system as claimed in claim 8, the optical component assembly further comprising a second lens and a third lens, wherein the second lens is disposed between the second light source module and the second side of the light consolidating device, the third lens is disposed between the third light source module and the third side of the light consolidating device, and the first lens, the second lens and the third lens are adapted to respectively parallelize the beams of the first light source module, the beams of the second light source module and the beams of the third light source module for emission to the light consolidating device.

10. The light source system as claimed in claim 9, wherein the light homogenizing component is one of a light tunnel or an integration rod.

11. The light source system as claimed in claim 10, wherein each of the second lens and the third lens is a concave lens.

12. A projection device, comprising:
   an imaging system; and
   a light source system as claimed in claim 1, providing a light source to the imaging system.

13. The projection device as claimed in claim 12, wherein the first light source module further comprises a first reflection mirror, the first LED is disposed between the first reflection cover and the first reflection mirror, and the first reflection mirror is adapted to reflect part of the beams of the first LED to the first reflection cover.

14. The projection device as claimed in claim 13, wherein the curved surface of the first reflection cover is an ellipsoid having two ellipse focuses, and the first LED is disposed at one of the two ellipse focuses of the first reflection cover.

15. The projection device as claimed in claim 14, wherein the light source system further comprises a second light source module having:
   a second LED emitting a plurality of beams;
   a second reflection cover having a curved surface to reflect the beams of the second LED into the optical component assembly, wherein the curved surface of the second reflection cover is an ellipsoid having two ellipse focuses, and the second LED is disposed at one of the ellipse focuses of the second reflection cover; and
   a second reflection mirror, wherein the second LED is disposed between the second reflection cover and the second reflection mirror, and the second reflection mirror is adapted to reflect part of the beams of the second LED to the second reflection cover.

16. The projection device as claimed in claim 15, wherein the light source system further comprises a third light source module having:
   a third LED emitting a plurality of beams;
   a third reflection cover having a curved surface to reflect the beams of the third LED into the optical component assembly, wherein the curved surface of the third reflection cover is an ellipsoid having two ellipse focuses, and the third LED is disposed at one of the ellipse focuses of the third reflection cover; and
   a third reflection mirror, wherein the third LED is disposed between the third reflection cover and the third reflection mirror, and the third reflection mirror is adapted to reflect part of the beams of the third LED to the third reflection cover.

17. The projection device as claimed in claim 16, wherein the second light source module and the third light source module are disposed corresponding to a second side and a third side of the light consolidating device respectively, and the light consolidating device consolidates the beams of the first light source module, the beams of the second light source module and the beams of the third light source module to form a consolidated beam.

18. The projection device as claimed in claim 17, the optical component assembly further comprising a second lens and a third lens, wherein the second lens is disposed between the second light source module and the second side of the light consolidating device, the third lens is disposed between the third light source module and the third side of the light consolidating device, and the first lens, the second lens and the third lens are adapted to respectively parallelize the beams of the first light source module, the beams of the second light source module and the beams of the third light source module for emission to the light consolidating device.

19. The projection device as claimed in claim 18, wherein each of the second lens and the third lens is a concave lens.

* * * * *